(12) United States Patent
Tan

(10) Patent No.: US 8,041,491 B2
(45) Date of Patent: Oct. 18, 2011

(54) RECONFIGURABLE STRUCTURE METHOD OF ESTIMATING VEHICLE LATERAL VELOCITY

(75) Inventor: Hualin Tan, Novi, MI (US)

(73) Assignee: GM Global Technology Operations LLC, Detroit, MI (US)

(*) Notice: Subject to any disclaimer, the term of this patent is extended or adjusted under 35 U.S.C. 154(b) by 815 days.

(21) Appl. No.: 11/874,222

(22) Filed: Oct. 18, 2007

(65) Prior Publication Data

US 2009/0105900 A1 Apr. 23, 2009

(51) Int. Cl.
*B60T 8/32* (2006.01)
*B60T 8/58* (2006.01)

(52) U.S. Cl. .......................... 701/71; 701/72

(58) Field of Classification Search ............ 701/33
See application file for complete search history.

(56) References Cited

U.S. PATENT DOCUMENTS

| | | | | |
|---|---|---|---|---|
| 6,161,905 | A * | 12/2000 | Hac et al. | 303/146 |
| 6,618,651 | B1 * | 9/2003 | Tan | 701/1 |
| 6,658,342 | B1 * | 12/2003 | Hac | 701/70 |
| 7,848,864 | B2 * | 12/2010 | Huang | 701/37 |
| 2003/0163226 | A1 * | 8/2003 | Tan | 701/1 |
| 2003/0229438 | A1 * | 12/2003 | Hac | 701/70 |
| 2004/0153216 | A1 * | 8/2004 | Tan | 701/1 |
| 2007/0005212 | A1 * | 1/2007 | Xu et al. | 701/70 |
| 2007/0021896 | A1 * | 1/2007 | O'Dea | 701/70 |
| 2008/0281482 | A1 * | 11/2008 | Huang | 701/29 |

FOREIGN PATENT DOCUMENTS

DE 102006026937 A1 1/2007

* cited by examiner

*Primary Examiner* — Shelley Chen
(74) *Attorney, Agent, or Firm* — Ingrassia Fisher & Lorenz, P.C.

(57) ABSTRACT

A system, method and computer program product is provided for estimating the lateral velocity of a vehicle. The method comprises providing a plurality of estimation structures, each estimation structure corresponding to one of a plurality of dynamic regions in which a vehicle may operate, determining in which of the plurality of dynamic regions the vehicle is operating to identify a first dynamic region, and generating a first regional lateral velocity estimation from a first estimation structure corresponding to the first dynamic region.

20 Claims, 3 Drawing Sheets

RECONFIGURABLE STRUCTURE METHOD OF ESTIMATING VEHICLE LATERAL VELOCITY

TECHNICAL FIELD

The present invention generally relates to automotive control systems, and more particularly relates to a method and a system used in a vehicular setting for estimating a vehicle lateral velocity.

BACKGROUND OF THE INVENTION

Vehicle dynamics control systems are increasingly used in automotive vehicles to improve vehicle safety and satisfy government regulations. Examples of such systems include vehicle active safety systems like vehicle electronic stability control (ESC), comprehensive safety vehicle (CSV), and vehicle lane change assist. For those safety systems to operate effectively, accurate and timely knowledge of vehicle dynamic states are required. One important vehicle dynamic state is the vehicle lateral velocity, which reflects the lateral dynamics of a motor vehicle. For example, in electronic stability control (ESC), vehicle lateral velocity is used to calculate the so-called "vehicle side-slip" angle, which is an important attribute of vehicle lateral dynamics in addition to the yaw rate signal. With side-slip control, the overall vehicle stability control can be more effective in both understeer and oversteer situations. It is also easy to understand that lateral velocity will be crucial for systems like lane change assist, which virtually controls the lateral direction of vehicle dynamics.

Currently there is no production sensor for vehicle velocities that is cost effective. As such, this signal is generally obtained through estimation methods using commonly available sensors such as wheel speed sensors, accelerometers, yaw rate sensors, and other related sensors. There are mainly two categories of methods of estimating vehicle lateral velocity: methods-based observer or Kalman filter theories with a simplified model of the vehicle lateral dynamics, and methods-based tire force estimation together with road surface identification. While many variations of the above two basic methods are proposed to deal with specific difficulties, the main hurdles of the above methods still remain. For the observer/Kalman filter type of methods, all the techniques proposed depends on a model of the vehicle lateral dynamics, such as the so-called Bicycle model or Kinematics model. As no model can effectively reflect all the operating regions of the vehicle dynamics, the methods in this category cannot accurately determine lateral velocity outside the fidelity of the used model. For the second category of methods based on tire force/road surface, the main drawback is that the accuracy of the lateral velocity estimation depends heavily on the accuracy of both tire force and road surface estimations, and on efficiency of the used routine for numerical integration; all those factors are problematic themselves.

Accordingly, it is desirable to implement a system and method for accurately estimating a vehicular velocity in all dynamic regions of a vehicle's operations. In addition, it is desirable to implement such a system and method using the commonly available sensors previously described. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method is provided for estimating the lateral velocity of a vehicle. The method comprises providing a plurality of estimation structures, each estimation structure corresponding to one of a plurality of dynamic regions in which a vehicle may operate, determining in which of the plurality of dynamic regions the vehicle is operating to identify a first dynamic region, and generating a first regional lateral velocity estimation from a first estimation structure corresponding to the first dynamic region.

A system is also provided for estimating the lateral velocity of a vehicle. A processor has a plurality of sensors configured to receive a plurality of operational parameters of a vehicle, the processor implementing a reconfigurable estimation algorithm which provides a plurality of estimation structures, each estimation structure corresponding to one of a plurality of dynamic regions in which a vehicle may operate, determines in which of the plurality of dynamic regions the vehicle is operating to identify a first dynamic region, and generates a first regional lateral velocity estimation from a first estimation structure corresponding to the first dynamic region.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The present invention is a novel reconfigurable structure method for estimating vehicle lateral velocity. The method makes use of a series of reconfigurable structures. The reconfigurable structures make use of more than a single mathematical model, in that one particular model may be used for a specific dynamic range in a vehicle's operation, and another particular model may be used for another dynamic range in the vehicle's operation. The method establishes conditions for dynamically switching among the various models. The models are reconfigurable, in that the models may be ordered differently in priority or by another factor or series of factors. In addition, the present invention provides a framework for handling parameter variations and sensor signal accuracy. As described later in details, by modeling parameter uncertainty and sensor signal accuracy "noise signals" with varying statistics, past experience, historical data, and other factors can be incorporated for better lateral velocity estimation under all vehicle dynamic conditions.

Figure 1:
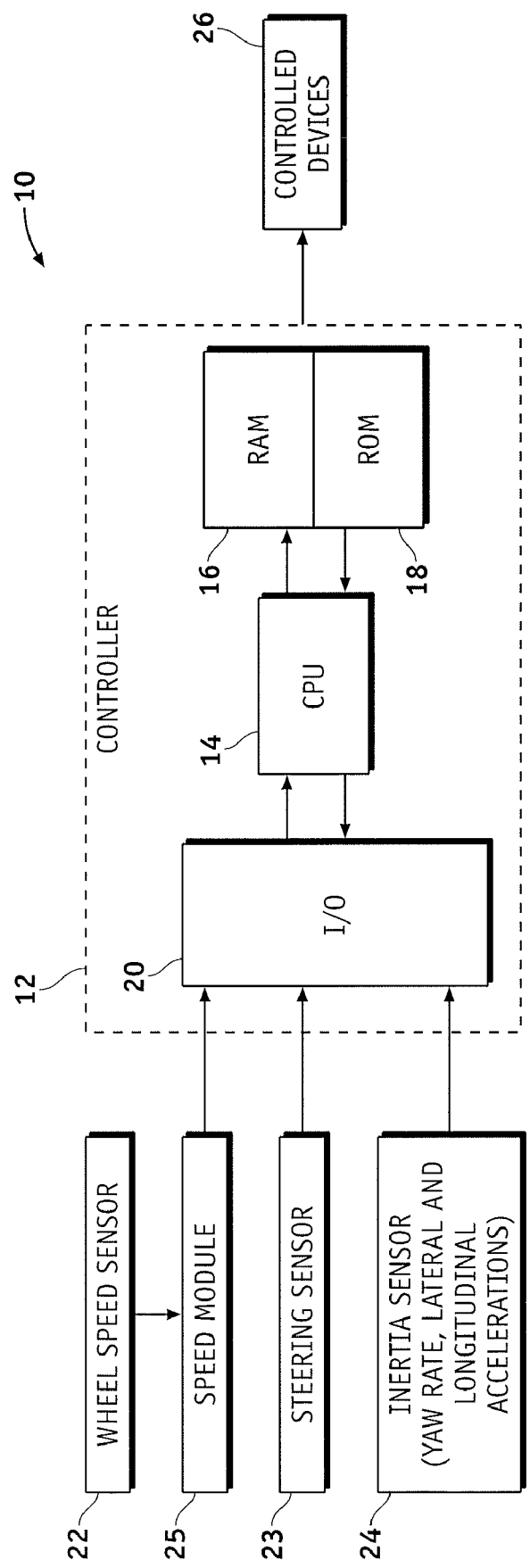
FIG. 1 is a hardware layout for an exemplary embodiment of the system and apparatus of estimating vehicle lateral velocity.

FIG. 1 illustrates an exemplary system 10 for estimating a vehicle lateral velocity. A processor/controller device 12 includes a central processing unit (CPU) 14 coupled to a memory device 16, which can include such memory as random access memory (RAM), non-volatile read only memory (NVROM), and possibly other mass storage devices. CPU 14 is coupled through an input/output (I/O) interface 20 to one of a potential plurality of sensors which provide operational data from a vehicle at a certain moment in time, such as vehicle speed, to the CPU 14. These sensors can include an inertia sensor cluster 24 which provides yaw rate, lateral acceleration, and longitudinal acceleration signals and a steering angle sensor 23. Also, a source for vehicle speed is required. It is well known for those skilled in the field that the source can either be a brake module that has wheel speed sensors 22 as main inputs to a speed module 25, as shown in the figure, or be calculated internally based on available sensor signals. As will be appreciated, system 10 can include a variety of additional components, such as additional sensors 24 which are configured in an array, or additional memory or processing components for a particular application. Additionally, system 10 as depicted may be a portion of a larger overall processing component of a vehicle. System 10 may be coupled to a power source (not shown) of the vehicle, such as a 12V battery. An output of system 10 is coupled to at least one controlled device 26 such as an actuator or a motor. For example, controlled device 26 can be an additional controlled subcomponent of the aforementioned ESC system.

CPU 14 may be configured to execute computer instructions which can be stored in memory 16, mass storage 18, or embodied in a computer program product such as a digital versatile disk (DVD) or compact disk (CD) or an equivalent. The computer instructions may include executable commands which incorporate methodologies and algorithms as further described below.

Figure 2:
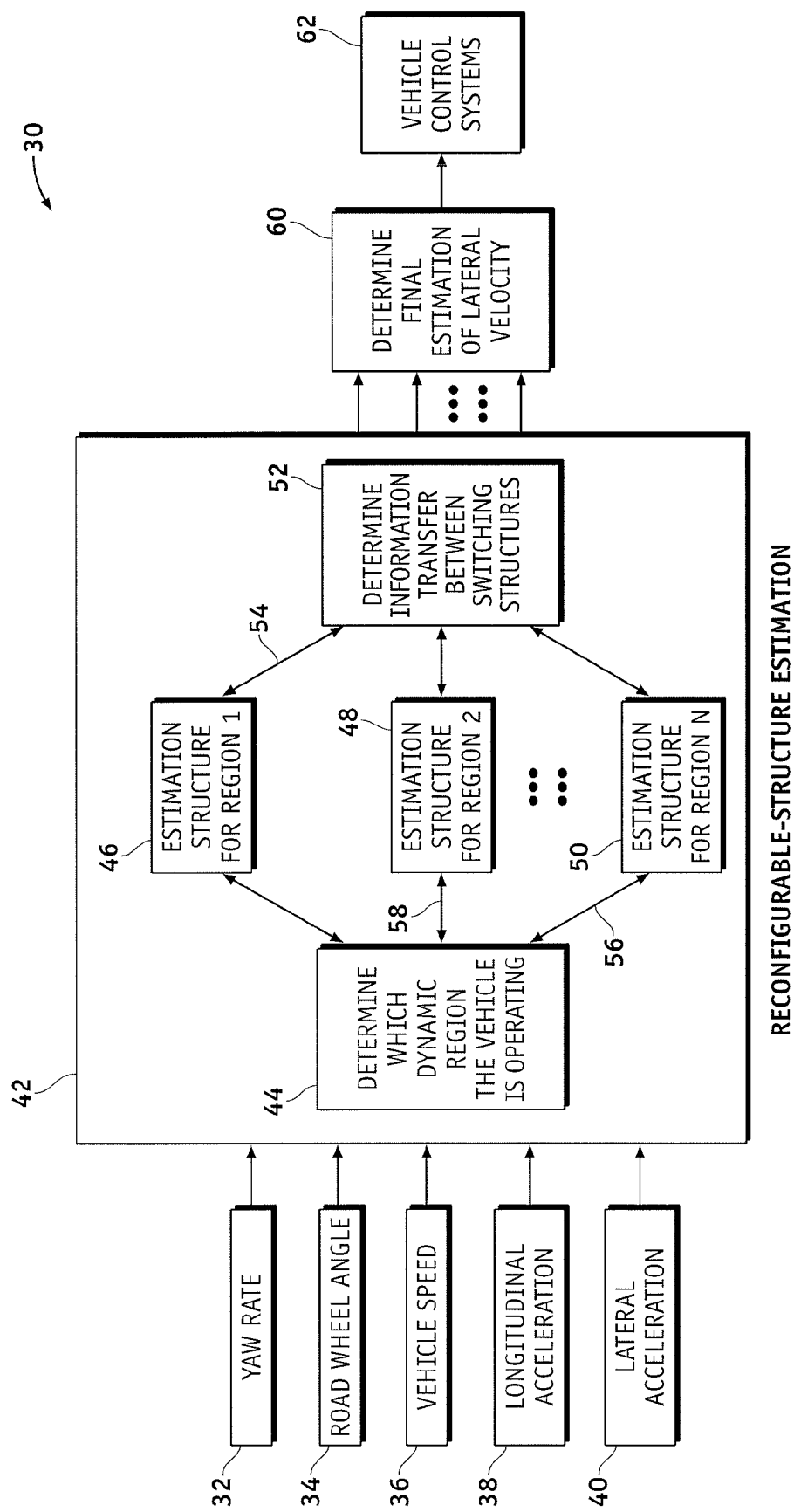
FIG. 2 is a block diagram describing the components of an exemplary implementation for the method of estimating vehicle lateral velocity.

FIG. 2 illustrates a block diagram of an exemplary vehicle lateral velocity estimation method 30, which can be implemented by system 10 (FIG. 1). A series of operational parameters, which may be obtained by sensors or other means as described in the system 10, are inputted. Parameters may include yaw rate 32, road wheel angle 34, vehicle speed 36, longitudinal acceleration (Ax) 38, and lateral acceleration (Ay) 40.

Block 42 illustrates an exemplary implementation of an overall reconfigurable structure mechanism for estimation of vehicle lateral velocity. The functionality of the overall reconfigurable structure mechanism includes first, a determination of a vehicle dynamic status to decide which (and in which order) of a plurality of estimation structures to utilize. Then, most the appropriate model is used to represent the lateral dynamics of the vehicle in each determined dynamic region for the estimation of the vehicle lateral velocity. Additionally, the functionality also implements a scheme which switches between the various estimation structures and associated initial velocity values at the appropriate time. Finally, all the information of determined dynamic regions and estimations from the various models are used to determine the final estimation of the vehicle lateral velocity.

Figure 3:
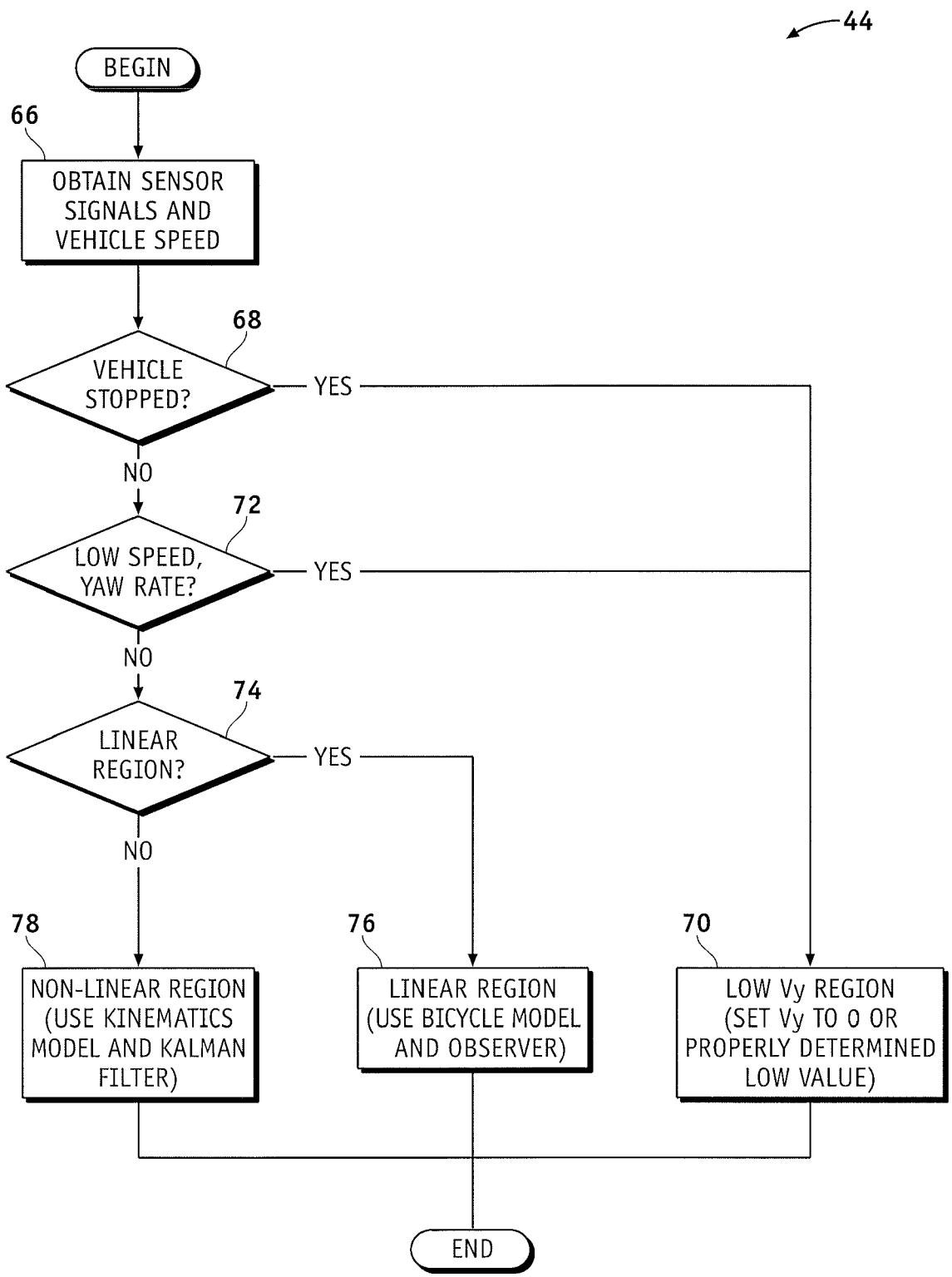
FIG. 3 is a flow diagram providing further details of an exemplary realization for the strategy of determining a vehicle dynamic operating region at a particular time.

Strategy 44 represents the first step of determining a respective vehicle operating region at a particular moment in time, based on the inputs of parameters 32-40. An exemplary strategy is depicted in FIG. 3 in greater detail. Turning to FIG. 3, strategy 44 begins (step 64) by the gathering of sensor signals and vehicle speed information (step 66) as previously described. Vehicle speed (input 36 in FIG. 2) can be obtained from a vehicle speed module which may use an estimation algorithm itself. Other sensor signals can be obtained from the various sensors as previously described.

Strategy 44 then queries whether the vehicle is stopped (step 68). If yes, then strategy 44 determines that the operation region is a low lateral velocity (Vy) region. In one embodiment, this Vy is correspondingly set to zero. In another embodiment, the value of Vy is set to a properly determined low value.

If the vehicle is not stopped, the strategy 44 queries whether the vehicle is traveling at a low speed and exhibits a corresponding low yaw rate (step 72). If so, the strategy 44 determines that the vehicle is again operating in the low Vy region (again, step 70).

If the vehicle is not determined to be traveling at a low speed, the method queries whether the vehicle is in the aforementioned linear region of operation (step 74). It is well known to those skilled in the art that there are ways to define or determine whether a vehicle is operating in the "linear region". One such determination is to test if vehicle speed, yaw rate, lateral acceleration are all within some predefined ranges. Furthermore, signals such as yaw acceleration and lateral jerk (the derivative of lateral acceleration) can also be used in combination with above mentioned signals to refine the determination of if the vehicle is operating in linear region. If the result in step 74 is yes, the strategy 44 determines that the vehicle is operating in the linear region (step 76). In one embodiment, the bicycle model and observer is then utilized in the estimation calculations. If the method 44 determines that the vehicle is not operating in the linear region (step 78), in one embodiment, a kinematics model and corresponding Kalman filter is utilized in the estimation calculations. Strategy 44 then ends (step 80).

Returning again to FIG. 2, a series of estimation structures for various regions (e.g., 1-n) are thereby established (shown by reference numbers 46, 48, and 50). The various estimation structures may incorporate a mathematical model which best represents the behavior of the vehicle in the corresponding particular region, and associated methods for estimating vehicle lateral velocity. For example, let blocks 46, 48, and 50 represent the low $V_y$ region, linear region, and nonlinear region, respectively. For low $V_y$ region 46, if vehicle stopped, or yaw rate is very small such as the vehicle is in straight driving operation, the lateral velocity can be set as 0. Otherwise, as both vehicle speed ($V_x$) and yaw rate (r) is quite low, the lateral velocity can be calculated as $$V_y = -rV_x \tag{1}$$

For linear region 48, the bicycle model represents the vehicle dynamics quite accurately and can be used for estimating vehicle lateral velocity. The bicycle model may be expressed by $$\dot{V}_y = a_{11}V_y + a_{12}r + b_1\delta$$

$$\dot{r} = a_{21}V_y + a_{22}r + b_2\delta \tag{2}$$

where $a_{ij}$ and $b_i$ are calculated from the vehicle's mass M, inertia $I_z$, vehicle speed $V_x$, Distance between vehicle center of gravity (CG) to front and rear axles $L_1$, $L_2$, and corner stiffness $C_f$, $C_r$ as below, and $\delta$ refers to the vehicle's road steering wheel angle.

$$a_{11} = -\frac{1}{M}\left(\frac{2C_f + 2C_r}{V_x}\right) \tag{3}$$

-continued $$a_{12} = -\frac{1}{M}\left(-MV_x + \frac{-2L_1C_f + 2L_2C_r}{V_x}\right)$$

$$a_{21} = \frac{1}{I_z}\left(\frac{-2L_1C_f + 2L_2C_r}{V_x}\right)$$

$$a_{22} = \frac{1}{I_z}\left(\frac{-2L_1^2C_f + 2L_2^2C_r}{V_x}\right)$$

$$b_1 = -\frac{2C_f}{M}$$

$$b_1 = -\frac{2L_1C_f}{I_z}$$

With the bicycle model, the lateral velocity estimation $\hat{V}_y$ can be calculated by the following linear observer:

$$\dot{\hat{V}}_y = a_{11}\hat{V}_y + a_{12}\hat{r} + b_1\delta + k_1(r-\hat{r})$$

$$\dot{\hat{r}} = a_{21}\hat{V}_y + a_{22}\hat{r} + b_2\delta + k_2(r-\hat{r}) \quad (4)$$

where $k_1$, $k_2$ are observer gains which are design parameters. Again, it is well known to those skilled in the art that the observer gains can be determined for specific applications based on vehicle platform and vehicle dynamic motion states. Furthermore, the above equations can be translated into proper digital forms for computer implementation.

Now for nonlinear region 50, when the vehicle is usually operating at the limit of tire adhesion. In this region, the most appropriate model to represent the vehicle's dynamic motion is the kinematics model as expressed below.

$$\dot{V}_x = rV_y + A_x$$

$$\dot{V}_y = -rV_x + A_y \quad (5)$$

where $A_x$ and $A_y$ are the vehicle longitudinal and lateral accelerations, and $V_x$, $V_y$, and r are vehicle speed, lateral velocity, and yaw rate as above. Those skilled in the art will appreciate that, because of our strategy to divide the vehicle dynamic operation into different regions, the drawback of unobservability issue of this model when yaw rate r is close to 0 is overcome. In addition, as the well-known difference between the vehicle acceleration signals ($A_x$ and $A_y$) and the measured ones ($A_{xm}$ and $A_{ym}$) when there are environmental factors such as graded banked roads, to implement the above kinematics model with measured data, the vehicle accelerations can be calculated as follows:

$$A_x = A_{xm} + N_x$$

$$A_y = A_{ym} + N_y \quad (6)$$

where $N_x$ and $N_y$ are "noise" signals representing the errors between vehicle accelerations and their sensor measurements. Furthermore, those skilled in the art will appreciate that other inherent parameter variation and measurement noise may also be modeled. For example, vehicle longitudinal speed obtained from another estimation algorithm may used as a measurement signal for the kinematics model. Thus the noise characteristic of this measurement can be determined from the experience of the longitudinal speed estimation algorithm. Thus, the modeling of the parameter variation and measurement noise are the insertion of experience and past knowledge on the specific system and signals into the above mentioned structures, so that better lateral velocity estimation can be obtained. For combined model (5, 6), the lateral velocity estimation can be calculated by the following Kalman filter equations. Let the coefficient matrices of the equations (5) be $$F = \begin{bmatrix} 0 & r \\ -r & 0 \end{bmatrix}, \quad H = [1 \; 0] \quad (7)$$

and Q be the covariance matrix of vector ($N_x$, $N_y$) R be the covariance of error signal for vehicle speed, and P be the covariance matrix of the estimation vector. Then the Kalman filter equations, together with equations (5, 6, 7), can be expressed as follows:

$$\begin{bmatrix} \dot{\hat{V}}_x \\ \dot{\hat{V}}_y \end{bmatrix} = -F\begin{bmatrix} \hat{V}_x \\ \hat{V}_y \end{bmatrix} + \begin{bmatrix} A_x \\ A_y \end{bmatrix} + PH^TR^{-1}(V_x - \hat{V}_x) \quad (8)$$

$$\dot{P} = FP + PF^T + Q - PH^TR^{-1}HP$$

where superscript "T" means matrix transpose, and "−1" means matrix inverse. Once again, it is well known those skilled in the art that the above equations can be translated into proper digital forms for computer implementation, and experience and knowledge can be conveniently incorporated into the determination and tuning of the parameters P and Q.

Estimation block 42 then determines an information transfer scheme between estimation structures (shown by reference number 52). For example, the order (which may reflect a priority that the structures are executed to perform estimations in a particular dynamic region) of the estimation structures can change as the vehicle changes from one dynamic region to the next. The information transfer scheme can reflect a variety of input factors, such as the aforementioned vehicle parameters. Additionally, the transfer scheme can reflect other input factors, such as weather factors, road conditions, and the like. The information transfer scheme can use a last estimated vehicle lateral velocity for a first dynamic region as an initial value for a subsequent vehicle lateral velocity estimation for a second dynamic region.

Referring again to FIG. 2, block 60 determines a final estimation of vehicle lateral velocity, which is provided to block 62 representing various vehicle control systems such as ESC systems or similar systems. The final estimation of vehicle lateral velocity can proceed in a variety of ways. In one embodiment, an estimation method can execute an ordered number of estimation structures based on dynamic region, taking into account the estimated lateral velocity for the previous region as the initial value for a subsequent dynamic region, as described above. Block 60 can take into account all of the available information (including estimations from each of the previously defined dynamic regions) to determine a final estimation. The final estimation can be from a particular dynamic region, such as region 1 or region 2 (blocks 46 and 48), or a weighted average of estimations from several dynamic regions may be obtained to render the final estimation.

In addition, at a single point, or at various points during the estimation method, the method can take into account a mathematical model representing parameter variation and measurement noise. Here again, as described previously, vehicle longitudinal speed obtained from a separate estimation algorithm may be used as a measurement signal for the kinematics model portion of the overall estimation. Thus, the noise characteristic of a lateral velocity estimation can take into account previous estimations of longitudinal velocity as "noise" in the lateral velocity calculation, which can be subtracted from the lateral velocity estimation to produce a more accurate result. Similar parameter variation and measurement noise modeling techniques can be incorporated into a final estimation determination.

Use of the foregoing techniques provides a novel approach, based on reconfigurable estimation structures of vehicle lateral dynamics for different dynamic regions. The method can address conditions which previous approaches do not take into account, such as unobservable modes in vehicle lateral dynamics, bank or sloped roads, vehicle roll/pitch motions, vehicle nonlinear dynamics, and vehicle parameter (such as cornering stiffness) variations. The approach described can address each and every condition and provide better overall lateral velocity estimation under real dynamic conditions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of estimating a vehicle lateral velocity, comprising:
   providing at least three estimation structures, each estimation structure corresponding to one of at least three dynamic regions in which a vehicle may operate, the at least three dynamic regions comprising a low lateral velocity region, a linear region, and a nonlinear region;
   determining in which of the at least three dynamic regions the vehicle is operating to identify a first dynamic region; and
   generating a first regional lateral velocity estimation from a first estimation structure corresponding to the first dynamic region.

2. The method of claim 1, further including
   providing an information transfer scheme between the first estimation structure, a second estimation structure corresponding to a second dynamic region, and a third estimation structure corresponding to a third dynamic region; and
   implementing the information transfer scheme to generate an overall estimation of the vehicle lateral velocity.

3. The method of claim 2, wherein the information transfer scheme combines data obtained from the first regional lateral velocity estimation with data obtained from a second regional lateral velocity estimation from the second estimation structure and with data obtained from a third regional lateral velocity estimation from the third estimation structure.

4. The method of claim 1, wherein determining in which of the at least three dynamic regions the vehicle is operating further includes obtaining a plurality of operational parameters of the vehicle.

5. The method of claim 4, wherein the plurality of operational parameters includes a yaw rate, a road wheel angle, a vehicle speed, a longitudinal acceleration, and a lateral acceleration.

6. The method of claim 3, wherein the information transfer scheme utilizes at least a portion of the first regional lateral velocity estimation as an initial value for the second regional lateral velocity estimation.

7. The method of claim 2, wherein the first, second, and third estimation structures further include first, second, and third mathematical models representing the first, second, and third dynamic regions.

8. A system for estimating a vehicle lateral velocity, comprising:
   a processor having a plurality of sensors configured to receive a plurality of operational parameters of a vehicle, the processor implementing a reconfigurable estimation algorithm which:
      provides at least three estimation structures, each estimation structure corresponding to one of at least three dynamic regions in which a vehicle may operate, the at least three dynamic regions comprising a low lateral velocity region, a linear region, and a nonlinear region;
      determines in which of the at least three dynamic regions the vehicle is operating to identify a first dynamic region; and
      generates a first regional lateral velocity estimation from a first estimation structure corresponding to the first dynamic region.

9. The system of claim 8, wherein the reconfigurable estimation algorithm:
   provides an information transfer scheme between the first estimation structure, a second estimation structure corresponding to a second dynamic region, and a third estimation structure corresponding to a third dynamic region; and
   implements the information transfer scheme to generate an overall estimation of the vehicle lateral velocity.

10. The system of claim 8, wherein the plurality of operational parameters includes a yaw rate, a road wheel angle, a vehicle speed, a longitudinal acceleration, and a lateral acceleration.

11. The system of claim 9, wherein the information transfer scheme combines data obtained from the first regional lateral velocity estimation with data obtained from a second regional lateral velocity estimation from the second estimation structure and with data obtained from a third regional lateral velocity estimation from the third estimation structure.

12. The system of claim 9, wherein the first, second, and third estimation structures further include first, second, and third mathematical models representing the first, second, and third dynamic regions.

13. The system of claim 12, wherein the mathematical models include a bicycle model and a kinematics model.

14. The system of claim 12, wherein the mathematical models include a model of operating parameter variation.

15. A computer program product for performing an estimation of a vehicle lateral velocity, the computer program product comprising a non-transitory computer-readable storage medium having computer-readable program code portions stored therein, the computer-readable program code portions comprising:
   a first executable portion for providing at least three estimation structures, each estimation structure corresponding to one of at least three dynamic regions in which a vehicle may operate, the at least three dynamic regions comprising a low lateral velocity region, a linear region, and a nonlinear region;

a second executable portion for determining in which of the at least three dynamic regions the vehicle is operating to identify a first dynamic region; and a third executable portion for generating a first regional lateral velocity estimation from a first estimation structure corresponding to the first dynamic region.

16. The computer program product of claim 15, further including a fourth executable portion providing an information transfer scheme between the first estimation structure, a second estimation structure corresponding to a second dynamic region and a third estimation structure corresponding to a third dynamic region; and a fifth executable portion for implementing the information transfer scheme to generate an overall estimation of the vehicle lateral velocity.

17. The computer program product of claim 16, wherein the information transfer scheme combines data obtained from the first regional lateral velocity estimation with data obtained from a second regional lateral velocity estimation from the second estimation structure and with data obtained from a third regional lateral velocity estimation from the third estimation structure.

18. The computer program product of claim 15, wherein determining in which of the at least three dynamic regions the vehicle is operating further including obtaining a plurality of operational parameters of the vehicle.

19. The computer program product of claim 18, wherein the plurality of operational parameters includes a yaw rate, a road wheel angle, a vehicle speed, a longitudinal acceleration, and a lateral acceleration.

20. The computer program product of claim 17, wherein the information transfer scheme utilizes at least a portion of first regional lateral velocity estimation as an initial value for the second regional lateral velocity estimation.

* * * * *